(12) United States Patent
Philipp et al.

(10) Patent No.: US 12,469,252 B2
(45) Date of Patent: Nov. 11, 2025

(54) FUSION OF SPATIAL AND TEMPORAL CONTEXT FOR LOCATION DETERMINATION FOR VISUALIZATION SYSTEMS

(71) Applicant: Carl Zeiss Meditec AG, Jena (DE)

(72) Inventors: Markus Philipp, Stuttgart (DE); Stefan Saur, Aalen (DE); Anna Alperovich, Aalen (DE); Franziska Mathis-Ullrich, Karlsruhe (DE)

(73) Assignee: Carl Zeiss Meditec AG, Jena (DE)

( * ) Notice: Subject to any disclaimer, the term of this patent is extended or adjusted under 35 U.S.C. 154(b) by 734 days.

(21) Appl. No.: 17/815,867

(22) Filed: Jul. 28, 2022

(65) Prior Publication Data

US 2023/0045686 A1 Feb. 9, 2023

(30) Foreign Application Priority Data

Aug. 4, 2021 (DE) .......................... 102021120300.7

(51) Int. Cl.
*G06V 10/74* (2022.01)
*G06T 7/246* (2017.01)
*G06V 10/77* (2022.01)

(52) U.S. Cl.
CPC .............. *G06V 10/74* (2022.01); *G06T 7/246* (2017.01); *G06V 10/77* (2022.01)

(58) Field of Classification Search
CPC ......... G06V 10/74; G06V 10/77; G06T 7/246
See application file for complete search history.

(56) References Cited

U.S. PATENT DOCUMENTS

| | | | |
|---|---|---|---|
| 12,327,406 B1 * | 6/2025 | Jindal | B64U 20/87 |
| 2017/0334066 A1 * | 11/2017 | Levine | G06N 3/045 |
| 2019/0213741 A1 * | 7/2019 | Nagae | G06T 5/73 |
| 2019/0362476 A1 * | 11/2019 | Pytlarz | G06T 5/92 |
| 2019/0384964 A1 * | 12/2019 | Ando | G06V 20/647 |
| 2020/0020100 A1 * | 1/2020 | Kyriakou | G06T 7/12 |
| 2021/0064850 A1 * | 3/2021 | Lee | G06V 40/1347 |
| 2021/0407309 A1 * | 12/2021 | Jarc | H04N 5/76 |
| 2023/0045686 A1 * | 2/2023 | Philipp | B25J 9/1697 |
| 2025/0148359 A1 * | 5/2025 | Boué | G06N 7/01 |
| 2025/0152295 A1 * | 5/2025 | Philipp | G06V 10/96 |

* cited by examiner

*Primary Examiner* — Kevin Ky
(74) *Attorney, Agent, or Firm* — Honigman LLP; Brett A. Krueger

(57) ABSTRACT

A computer-implemented method for generating a control signal by locating at least one instrument by way of a combination of machine learning systems on the basis of digital images is described. In this case, the method includes determining parameter values of a movement context by using the at least two digital images and determining an influence parameter value which controls an influence of one of the digital images and the parameter values of the movement context on the input data which are used within a first trained machine learning system, which has a first learning model, for generating the control signal.

19 Claims, 9 Drawing Sheets

100

102 Providing at least two digital images of the same spatial scene with a movement of the instrument...

104 Determining parameter values of a movement context...

106 Determining an influence parameter value which controls an influence of one of the digital images and of the parameter values of the movement context on the input data... within a first machine learning system

108 Using one of the images and parameter values of a movement context as input data for an ML system

FIG. 1

FUSION OF SPATIAL AND TEMPORAL CONTEXT FOR LOCATION DETERMINATION FOR VISUALIZATION SYSTEMS

CROSS REFERENCE TO RELATED APPLICATIONS

This U.S. patent application claims priority to German Patent Application DE 10 2021 120 300.7, filed Aug. 4, 2021. The disclosure of the prior application is considered part of the disclosure of this application and is hereby incorporated by reference in its entirety.

TECHNICAL FIELD

The disclosure relates to a computer-implemented method for generating a control signal, more precisely to a computer-implemented method for generating a control signal by locating at least one instrument by way of a combination of machine learning systems on the basis of digital images. The disclosure further relates to a corresponding control system for generating a control signal by locating at least one instrument by way of a combination of machine learning systems on the basis of digital images and to a corresponding computer program product.

BACKGROUND

In the case of complicated operations, for example neurosurgery and/or operations on the brain (e.g., tumor removal) or the spinal column, use is increasingly made of robotic assistance systems and assistance functions, for example for surgical microscopes. As a rule, these require a context understanding of the surgical scenes, ideally on the basis of recorded camera image data. The location where the surgeon currently operates with their surgical instruments within the field of view of the surgical microscope is important information that should be extracted from the camera image data. This information can be determined by recognizing instrument tips in the camera image. A number of obstacles in relation to the visual conditions must be overcome in this case. By way of example, this includes the seepage of blood into the surgical procedure, blurry image recordings and, in particular, a large number of different instrument types which the surgeon may use.

To address this problem, attempts have already been made to use spatial information—for example from a recorded image—and temporal information—for example by calculating the optical flow. Several attempts have also been made to process the spatial and temporal information by a machine learning system without further constraints. However, it was found that fusing is accompanied by a significant risk of the utilized algorithm preferring or ignoring information from one of the two modalities—i.e., spatial and temporal information—in the case of a lack of additional constraints. This leads to a clear falsification of the interpretation of the surgical scene, and hence to a generation of incorrect control signals for possibly utilized robotic assistance systems.

By way of example, if the temporal context is used and the spatial context is ignored, a drop in the recognition accuracy of instruments in known data on the basis of the quality of the temporal information (optical flow) is to be expected. Then again, if only the spatial context is used but the temporal context is ignored, a normally utilized algorithm reacts less well to unknown scenes, instruments and situations since spatial input data have a greater variability than temporal input data. However, the use of both information modalities is required in view of a generalizability of instrument tip recognition in very changeable situations. Examples of changeable situations are different types of operations on different anatomies, different hospitals and operating teams, and a high variability of instrument characteristics in microsurgery.

Hence, there is the need to address the insufficiencies of the existing solutions, in particular to ensure that the available information—in particular spatial and temporal information—that can be used to control robotic assistance systems is considered to a balanced extent in order hence to ensure that incorrect interpretations by the utilized systems—for example when using new instrument types—are avoided.

SUMMARY

According to an aspect of the present disclosure, a computer-implemented method for generating a control signal by locating at least one instrument by way of a combination of machine learning systems on the basis of digital images is presented. In this case, the method includes providing at least two digital images of the same spatial scene with a movement of the instrument in the scene as input data, determining parameter values of a movement context by using the at least two digital images and determining an influence parameter value which controls an influence of one of the digital images and the parameter values of the movement context on the input data which are used within a first trained machine learning system, which has a first learning model, for generating the control signal.

According to a further aspect of the present disclosure, a control system for generating a control signal by locating at least one instrument by way of a combination of machine learning systems on the basis of digital images is presented. The system comprises a processor and a memory connected to the processor, the memory being able to store program code segments which, when executed by the processor, can prompt the processor to receive at least two digital images of the same spatial scene with a movement of the instrument in the scene as input data, determine parameter values of a movement context by using the at least two digital images, and determine an influence parameter value, which controls the influence of one of the digital images and the parameter values of the movement context on the input data which can be used within a first trained machine learning system, which has a first learning model, for generating the control signal.

The proposed computer-implemented method for generating a control signal by locating at least one instrument by way of a combination of machine learning systems on the basis of digital images has a plurality of advantages and technical effects, which may also apply accordingly to the associated control system:

The concept proposed here advantageously addresses the insufficiencies of previously utilized systems for controlling assistance systems in microsurgery. The previously insufficient correctly weighted consideration of available information from different modalities—i.e., spatial and temporal information—can be considered by the procedure proposed here in a respectively optimized manner such that incorrect interpretations of the surgical scene are avoided. In particular, this also includes a recognition of previously unknown instrument tips, which should be reliably identifiable for a safe functioning of a surgery assistance system.

The concept proposed here facilitates a combination and weighting of different information modalities—i.e., spatial and temporal information-suitable for any situation, and so none of the modalities are over-weighted or under-weighted. To this end, the training of the involved machine learning systems, just like their use in the inference phase, can be implemented taking at least one additional constraint into consideration—in contrast to systems in the prior art.

What this achieves is that instrument tips-even instrument tips of previously unknown and/or new instruments—are recognized more reliably even under difficult conditions. This would not be the case if, for example, only the temporal context were used and the spatial context were ignored, as may be the case in conventional approaches. Additionally, what is avoided on the basis of the concept proposed here is that use is only made of the spatial context and the temporal context is ignored, which would lead to the utilized algorithm reacting worse to previously unseen situations (e.g., new operation type, new operating team with a new procedure, a different hospital, different light conditions, etc.), as would be the case in conventional approaches.

The concept proposed here also effectively assists a recognition of a plurality of instruments (for example two instruments) guided simultaneously by the surgeon in a surgical scene. An extrapolation of movement directions and/or tangents in relation to the movement directions of the instrument tips and a point-of-intersection determination of such lines allows the generation of control signals for a robotic assistance system, which control signals ensure that the respective robotic assistance system always focuses on the center of the surgical scene-specifically the current core of the actual intervention. The latter may be represented by the point of intersection of the tangents.

Moreover, the basic concept presented here offers a multiplicity of variations in relation to implementation variants, in order to consider the information modalities—i.e., e.g., spatial and temporal information modalities—in suitable and balanced fashion. Moreover, the presented basic concept can be elegantly extended to further modalities.

Moreover, two different ways of linking information of feature tensors of the spatial and temporal modality are presented. Firstly, it is possible to use an external control parameter which can be determined by means of an image unsharpness map, for example. Then again, it is also possible to weight the inference accuracy or the inference certainty/uncertainty or corresponding confidence values of feature tensors (i.e., corresponding K which the spatial context (spatial modality) or the temporal context (temporal modality; optical flux) of machine learning systems directly for a weighting of feature tensors of the spatial and temporal modality or spatial and temporal dimension.

Further exemplary embodiments are presented below, which can have validity both in association with the method and in association with the corresponding system.

According to a special embodiment of the method, the control signal can be adapted to control a robotic visualization system, or the control signal can explicitly control a robotic assistance system. In this case, the robotic visualization system can adopt different forms, for example also a surgical robot which, in addition to pure visualization, also assists within the scope of a surgical intervention and optionally guides and/or uses a surgical instrument or assists with or carries out a further different surgical activity. Such a surgical activity may also be partly carried out under remote control.

According to an advantageous embodiment of the method, the influence parameter value can be determined by extracting parameter values of an image property from at least one of the at least two or more digital images. It would be helpful if the digital images have not only a spatial context but also a temporal context in common. "Spatial context" means that substantially the same scene is presented, in which the instrument has only moved little or not moved at all (i.e., a distance below a preset threshold); temporal context means that, for example, these are two or more successive images (directly or indirectly following one another), which were recorded with a time interval between them such that the recording times are within a time window defined in advance, for example if a timestamp of the first recording is considered to be a start time bracket (left temporal bracket). In this case, the time interval between the two or more digital images (image recordings, for example by means of an RGB camera) may be fixed and predetermined, or it may be event-controlled, that is to say the time interval can be variable.

According to advantageous embodiments of the method, the parameter values of the image property can be represented by at least one indicator value or at least one digital map selected from a group comprising the following: an image unsharpness map, an image contrast map, an image color saturation map, image color homogeneity map, an indicator value for specular reflection zones, an image brightness map, a shadow effect indicator value, a masking index value (or superimposition index value), and an image artifact index value—or a combination of the aforementioned—in each case related to the at least one image.

The following additional factors may play a role for the parameter values of the image property: The image unsharpness map may relate to a focus unsharpness and/or a motion blur; in this way, two substantial sources of image unsharpness would be covered.

An image color homogeneity map may be advantageous if there are entire image regions which have little texture. This may occur, for example, if a majority of the digital image is single-colored—e.g., red. This often occurs in neurosurgery. This can cause disparities between images in a temporal sequence only to be able to be estimated or determined with difficulties. The optical flux could only be determined inaccurately in this case.

An indicator value for specular reflection zones may be indicative for apparent object motion, and in particular indicative for which can impair ("confuse") methods for determining the optical flux.

A shadow indicator value would be a measure of whether the instrument moves through a shadow of another object. This could cause the color impression of the instrument to change significantly along the instrument trajectory. This also makes a determination of disparity, and hence the determination of the optical flow, more difficult.

A masking index value would be a measure of masking of instruments by other objects, for example tissue or other instruments. What should be taken into account here is that masked pixels cannot be matched—i.e., assigned—and "confuse" the methods for determining the optical flow.

Moreover, artifacts that are determined in an image may be the basis for an image artifact index value. These can also make the orderly parameter determinations more difficult.

In principle, there can be different methods or emphases of algorithms on the basis of the specified values and maps for individual regions of the digital images in order to avoid disadvantageous indicator values or map regions falsifying an assessment of the parameter values of the image property. All methods of determining the image property may in this case be based on systems of machine learning or else be realized explicitly—i.e., using conventional methods of image processing such as edge filters, for example—and/or partly in hardware-based fashion. Should machine learning systems be used, these would be trained by a combination of training data (input data and expected output data) for the purposes of forming a respectively appropriate machine learning model.

According to another elegant embodiment of the method, at least one of the at least two digital images, the parameter values of the movement context (i.e., a temporal context or a temporal modality) and the parameter values of the image property can be used as input values for the first machine learning system—which has an associated learning model (cf. also FIG. 2 described below). Consequently, all directly or indirectly available parameter values, and hence the entire available digital information content, can be used for inference by the corresponding machine learning system or a combination of the utilized, plurality of machine learning systems in order to make available a control signal at the output of the machine learning system, which control signal is able to be used to the best possible extent and does not overestimate or underestimate any of the modalities.

According to an extended embodiment of the method, a second machine learning system—with an appropriately trained learning model—may be present, said machine learning system having been trained to generate output values in the form of a first feature tensor (e.g., F1; spatial) from the at least one digital image. Furthermore, a third machine learning system—with an appropriately trained learning model—may be present, said machine learning system having been trained to generate output values in the form of a second feature tensor (e.g., F2; time/temporal) from the parameter values of the movement context.

Moreover, a weight unit may be provided, the latter being adapted to control the influence of the first feature tensor vis-à-vis the influence of the second feature tensor on a fourth machine learning system in the first machine learning system. This fourth machine learning system can then directly or indirectly generate the output value of the first machine learning system. In this way, the aforementioned first machine learning system can be realized by a combination of this plurality of machine learning systems specified here.

In this case, it should be noted that the first feature tensor is characteristic for at least one spatial feature of at least one of the digital images and that the second feature tensor is characteristic for at least one temporal feature—e.g., a temporal context—of the digital images.

Moreover, a buffer may be provided for storing the at least one digital image—or the plurality of digital images. Advantageously, it could always be the most recently received digital image that is stored. However, one or more memories for a plurality of successive digital images (which directly or indirectly follow one another) can also be provided.

According to a further developed embodiment, the method may additionally include increasing the influence of the first feature tensor—i.e., characteristics in spatial dimensions-vis-à-vis the second feature tensor if an image property value—for example influenced by or derived from the optical flow or derived from one of the above-described parameter values of the image property in the form of at least one indicator value or digital map—is higher than a given threshold. Optionally, a plurality of influencing factors may be decisive therefor.

Additionally, the method may bring about an increase in the influence of the second feature tensor—i.e., characteristics in temporal dimensions—vis-à-vis the first feature tensor (which embodies spatial aspects) if the image property value is lower than a given threshold. A weight unit (as described later, for example in the context of FIG. 4 or 5) may be provided to this end.

According to another elegant embodiment, the method can over-weight the second feature tensor—which represents the optical flow-vis-à-vis the first feature tensor-taking account of spatial aspects—in or at optically sharp image regions. By contrast, in optically blurred image regions the first feature tensor can be over-weighted vis-à-vis the second feature tensor. Tried and tested methods for determining optically sharp or optically blurred image regions are known to the person skilled in the art.

A combination of the first and the second feature tensor weighted thus can then cause the parameter values of the optical flow to be determined by use of the at least two digital images as input data for a fifth machine learning system—e.g., a PWC(=pyramidal processing, warping and the use of a cost volume) net—with the fifth machine learning system generating the parameter values of the optical flow as output data or predicting these within the context of machine learning. Corresponding training with training data and associated expected parameter values for forming a machine learning model would be a precondition.

It should be added that the PWC method was presented mid-2018 by NIVIDIA. The application in surgical practice and, in particular, in robotic assistance systems as proposed here however relates to developed systems which take account of the precise requirements in the medical field. Alternatively, a RAFT (recurrent all-pairs field transforms)—among others-would also be possible in place of the PWC method.

According to an embodiment of the method with a different architecture (as described below in conjunction with FIG. 5), the first trained machine learning system may comprise the following: a second ML system trained to generate values of a first feature tensor—e.g., related to spatial aspects (e.g., F1)—and a first uncertainty value (e.g., U1)—in particular related to the inferences in relation to the first feature tensor and, in particular, also pixel-related—from the at least one digital image.

Moreover, this embodiment may comprise a third machine learning system which was trained to generate values of a second feature tensor (e.g., F2)—e.g., relating to the temporal context such as the optical flow—and a second uncertainty value (e.g., U2)—in particular in relation to the inferences in respect of the second feature tensor—from the parameter values of the movement context.

In this case, the first feature tensor and the first uncertainty value and also the second feature tensor and the second uncertainty value may serve as input data for a fourth machine learning system, which was trained (and consequently has the corresponding learning model) to generate the control signal.

In this architecturally different exemplary embodiment of the just described architecturally different embodiment, provision can also be made of a buffer for storing the at least one digital image, as already described in more detail above.

According to another advantageous embodiment of the method—with the architecturally different exemplary embodiment being used—the first trained machine learning system may additionally comprise a weight unit which controls the influence of the first feature tensor vis-à-vis the influence of the second feature tensor on the fourth machine learning system. In this case, the weight unit may be parameterizable or the parameter values may have been optimized by means of a training.

According to a supplementing advantageous embodiment, the method—also in the architecturally different exemplary embodiment—may additionally include increasing the influence of the first feature tensor-related to spatial aspects-vis-à-vis the second feature tensor-related to temporal aspects-if the second uncertainty value—e.g., related to the optical flow—is higher than the first uncertainty value, and otherwise the method may include increasing the influence of the second feature tensor vis-à-vis the first feature tensor if the first (i.e., spatial) uncertainty value is higher than the second (i.e., temporal) uncertainty value.

Hence, an additional constraint is also considered in the architecturally different exemplary embodiment—in comparison with the architectural (method) approach described first—which constraint was previously not considered in the prior art and leads to better control signals for an assistance system.

According to an interesting embodiment of the method, either the first uncertainty value or the second uncertainty value can be zero. Logically, there would be no uncertainty and the inference value would be the nominal value of the output. Consequently, only one of the two uncertainty values—i.e., the uncertainty value for the first or the second feature tensor (that is to say the uncertainty value not equal to zero)—would be determined in this way. In this way, a component outlay for the electronic systems in the case of a hardware-based solution or a computational outlay in the case of a solution based entirely on software could be reduced, and hence the overall system could be made more efficient.

According to a further exemplary embodiment of the method, the uncertainty values can be determined by an ensemble learning method. This development could also be applied in all other machine learning systems that can be used by the method, in order to increase the efficiency during the inference phase.

Furthermore, embodiments can relate to a computer program product able to be accessed from a computer-usable or computer-readable medium that comprises program code for use by, or in conjunction with, a computer or other instruction processing systems. In the context of this description, a computer-usable or computer-readable medium can be any device that is suitable for storing, communicating, transferring, or transporting the program code.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1 shows a flowchart-like illustration of an exemplary embodiment of the computer-implemented method according to the disclosure for generating a control signal by locating at least one instrument by way of a combination of machine learning systems on the basis of digital images.

Like reference symbols in the various drawings indicate like elements.

DETAILED DESCRIPTION

Figure 2:
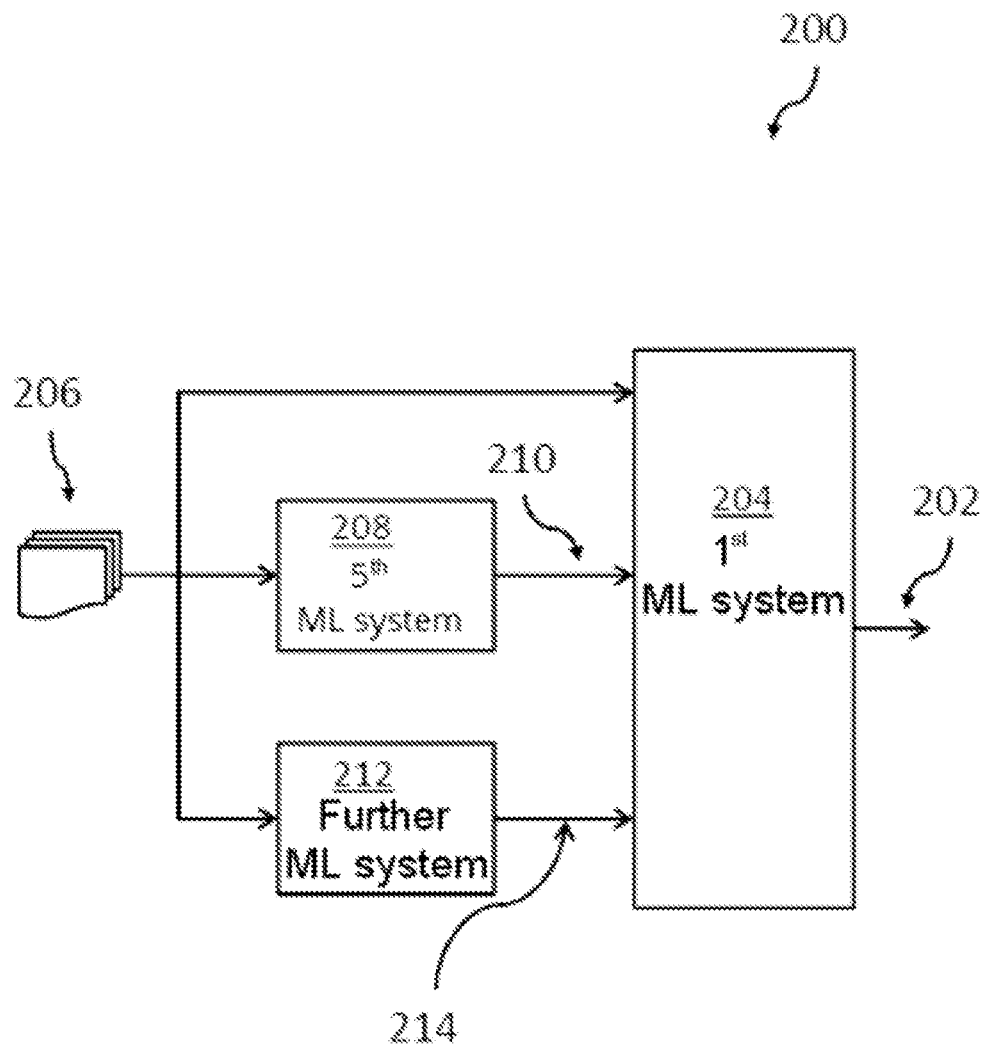
FIG. 2 shows a basic structure of an exemplary embodiment of a system which implements the proposed concept.

In the context of this description, conventions, terms and/or expressions should be understood as follows:

The term "control signal" may describe an analog or digital signal, or else a combination of a plurality of analog and/or digital signals. They may permit direct use for controlling a robotic assistance system. Then again, an indirect use—for example following a further transformation of the control signal(s)—for an automatic assistance system is possible.

The term "locating" may describe the determination of coordinates in a recorded digital image for a special feature of an element in image data of one of the recorded digital images. An example would be an instrument tip within a recording which is represented by a digital image of a surgical operation. Locating may however also relate to something different, for example to a crossing point of two virtual lines which represent continuations of at least two instruments (or other tools) and/or the movement directions thereof, so that the center of the surgical (or other) activity can be determined. In this case, one of the instruments can be an aspirator while the other instrument can be for example a pair of (bipolar) forceps, a wire loop, a pair of scissors, atrophy equipment, an ultrasound aspirator (CUSA) or a scalpel.

The term "instrument" can describe a multiplicity of different instruments, for example surgical instruments, which are used in microsurgery and/or neurosurgery. The concept presented here need not explicitly "know" the utilized instruments; i.e., the presented concept is able to work even in conjunction with those instruments for which it had not been trained directly up until this point. Here, it is always the respective instrument tip that is the focus of the considerations since the operation is only carried out with this part of the instrument. Thus, locating an instrument can be understood to mean that at least one part of an/the instrument is located.

The term "digital image" may describe an image of a surgical scene, which was recorded using a digital camera (e.g., an RGB camera). Typically, a plurality of digital images may be recorded temporally in succession, as is conventional when recording films. Each individual data frame would then represent image data of an individual digital image.

The term "moving the instrument in the scene" may relate in particular to the movement of a recognized instrument tip or of an instrument tip to be recognized (or of any other prominent point on the surgical instrument). The connecting line of the instrument tip in digital images recorded directly or indirectly in succession may be characteristic for the movement of the instrument in the scene.

The term "parameter value" may describe different things in the context of the present text. Firstly, it is possible for the parameter value to describe a simple scalar value. Then again, the parameter value—for example in the context of a determined movement context—may also be an explicit vector or a matrix with different values; in general terms: values of a tensor field. This extended meaning of a parameter value is also used in conjunction with a semantic segmentation of a digital image, within the scope of which an inference result of a machine learning system may be a pixel-by-pixel assignment of individual pixels of the digital image to detected objects.

In this case, the term "movement context" may assess-within a sequence of digital images-a movement of an element within the plurality of digital images. In this case, the entire scene which is represented by the image and which takes up the vast majority of the digital image remains largely unchanged. Within the scene, one or more objects move vis-à-vis the background of the overall scene. An analysis of such a context can be captured by means of the "optical flow" analysis method. In this case, the optical flow of an image sequence is understood to be the vector field of a velocity of visible points (e.g., pixels) of the object space, projected into the image plane, in the reference system of the imaging optical unit. Consequently, the optical flow can represent a relatively important presentation of movement information in early stages of image processing. Similar to the semantic segmentation of individual pixels, the optical flow also assists an assignment of pixels to objects.

The term "influence parameter value" may have a plurality of manifestations-similar to the "parameter value" term mentioned above. As an example, a weighting of the spatial modality vis-à-vis the temporal modality of objects and movements thereof in a sequence of digital images is mentioned. Depending on the assessment of the spatial or temporal modality, feature tensors that belong to these two modalities can be weighted differently and thus have a different influence on a subsequent algorithm or subsequent system. As a very specific example, the influence parameter value can be a simple scalar value or else a tensor field which characterizes characteristics of the optical flow. Then again, the influence parameter value may also be an uncertainty value which is a result of a machine learning system for a main inference, which however in turn could also be expressed as a tensor field. An example could be seen in pixel-by-pixel uncertainty values as a result of a semantic segmentation.

The term "trained machine learning system" describes a system which may be implemented completely in hardware or completely in software, but also as a mixture of the two variants. A typical example in this case would be a neural network, which may have nodes and connections between the nodes-so-called edges. Typically, a number of nodes are provided between the input side and output side. Deep neural networks (DNN) may have a number of hidden node planes (hidden layers).

Following a training phase, such systems are able to generate output results (so-called inferences) for an unknown input. Input values and expected output values ("ground truth") are fed to the machine learning system in the training phase. The internal parameter values typically adjust independently by way of feedback functions along the learning process (e.g., an optimization process in respect of minimum error allowed between a given input value and an expected output value).

In the inference phase, the results are generated on the basis of unknown input; hence the expression "inference value" arises. In addition to the inference value, the machine learning system may also yield an uncertainty value which is a measure for the confidence the machine learning system gives its own inference value.

Moreover, it is also true that the basic structure, that is to say the topology, the type of feedback function, etc., of the machine learning system, for example in the form of a neural network, is defined by what are known as hyperparameters, which are typically intrinsic to the system. By contrast, parameter values of the nodes and edges can be trained by the learning process (see above)—i.e., they are adapted in self-optimized fashion such that there is the smallest possible error in the inference.

In this context, it is also worth noting that machine learning models can be cascaded; that is to say, output values of one machine learning system can be used as input values for another machine learning system. Specifically, a learning system which represents characteristics of an optical flow as inference value(s), for example, may be used as input data for a subsequent machine learning system which predicts a feature tensor ("feature map") for a temporal contact (e.g., F2, cf. below).

All machine learning systems specified in this text may be implemented as neural networks. A learning model is inherent to each machine learning system following the individual training. A plurality of cascaded machine learning systems may also be trained together and/or may also be considered as a combined machine learning system. Moreover, output tensors of machine learning systems can be fused—for example using a weight unit.

The term "learning model" can be understood in the development of the definition of the machine learning system to be the sum of the parameter values of the machine learning system, learned by the training, as a result of training using a set of training data. Other sets of learning data would lead to other learning models, and hence to other inference results, even though the hyperparameters of the learning system would remain constant.

The term "robotic visualization system" may describe a robot or robotic arm which, for example, carries on its outermost extremity an image capturing unit which, depending on surgical (or other) context of an operation, captures the center of the operating procedure to the best possible extent by means of a camera. In this respect, the robotic visualization system may be part of a surgical microscope, with the aid of which for example the focus is always placed on an optical plane of a surgical instrument, and which represents the tip of the surgical instrument always in the center of the visual display unit where possible.

The term "parameter values of an image property" may describe a number of different characteristics of a digital image. These include, in particular, spatial image properties which may be specified by appropriate parameter values (as already described: within the meaning of a simple scalar value right up to a tensor field).

The term "feature tensor" may describe a result of a machine learning system. A person skilled in the art might be more familiar with the corresponding term "feature map" (Fx). In this case, a certain assessment value can for example be assigned to each pixel of a digital image: for example, "belongs to object A", "is a constituent part of an edge", "is located on the outer edge of the image", "is a pixel of a reflection", "is a background pixel", etc. In this case, different machine learning systems that were trained by different analysis tasks may output different types of feature tensors.

The term "weight unit" can assess data belonging to, e.g., a spatial context as having a greater or lower influence on downstream systems than data belonging to, e.g., a temporal context (e.g., optical flow). In general, it is possible to state that a weight unit is suitable for amplifying or attenuating data, which belong to a plurality of different modalities, as input values for a downstream unit.

The term "optically sharp image regions" may describe the regions of the digital image in which there is greater distinguishability between details in the image than in "optically blurred image regions". In the context of this description, this means the physical sharpness that is measurably present and not the subjective sharpness impression.

The term "uncertainty" or uncertainty value may in this case be a measure for how confident a machine learning system itself is about an inference value by said machine learning system. Thus, the machine learning system does not only generate the inference value(s) but also a statement about the confidence about the predicted output value of the machine learning system. The term of the confidence value in respect of the own inference, which can usually be output as a percentage scalar value, is not untypical for neural networks. It is possible to carry out conversion between the two terms:

uncertainty value=1−confidence value.

The uncertainty value of the inference can also be used in the case of a semantic segmentation of pixels of a digital image. In this case, the term "semantic segmentation" means that a machine learning system predicts the object category of a pixel of the digital image for each pixel of the digital image. Consequently, a machine learning system would predict as many scalar confidence values as there are digital image pixels in the case of a semantic segmentation. In this case, it is necessary to deal with values of an uncertainty matrix or values of an uncertainty tensor.

Should a result of a semantic segmentation be visualized again, these images often look like imprecise false-color representations of the original images because different colors are used for differently identified object categories. In this case, the digital image of the "ground truth" would be the unfalsified original image while the predicted digital images of the semantic segmentation inference use other colors, and outlines of objects would be blurred or else partly incorrect-depending on the degree of identification of the belonging of a pixel to an identified or unidentified object. The object categories that are important in the context of the concept presented here would be "instrument", "instrument tip", other operation utilities (e.g., swab), "tissue" and "other artifacts".

In the context of machine learning systems, the term "ensemble learning method" describes the fact that a plurality of learning algorithms or learning models of the same machine learning system or of different machine learning systems are used to generate or predict a result, in order either to obtain a better performance (faster result) or a higher confidence value (i.e., a lower uncertainty value) for an inference. The plurality of learning models can be used in parallel in this case. A mean value which is then used as inference result can be formed from the different inference result values. Alternatively, the mean value can also be determined over time using a single learning model-under the assumption of small continuous movements in the input image data.

A detailed description of the figures is given below. It is understood in this case that all of the details and information in the figures are illustrated schematically. What is shown initially is a flowchart-like illustration of an exemplary embodiment of the computer-implemented method according to the disclosure for generating a control signal by locating at least one instrument by way of a combination of machine learning systems on the basis of digital images. Further exemplary embodiments, or exemplary embodiments for the corresponding system, are described below:

FIG. 1 illustrates a flowchart-like illustration of a preferred exemplary embodiment of the computer-implemented method 100 for generating a control signal by locating at least one instrument—in particular an instrument tip, for example within an operating field—by way of a combination of machine learning systems on the basis of digital images. The instruments can be surgery instruments such as scalpel, aspirator, forceps, scissors, etc., but may also relate to any type of tools in virtually any sector. This may also relate—in a wider sense—to a crossing point of virtual continuations or extrapolated movement trajectories of instruments or tools.

The method 100 includes providing, 102, at least two digital images of the same spatial scene with a movement of the instrument in the scene as input data. It is possible to derive both spatial information and temporal information—e.g., optical flow—from the at least two digital images. If a plurality of digital images are available in a temporal sequence, the respective most recent digital image (or any other selected digital image) can be used for the spatial modality. By way of example, the digital images may be recorded by means of a digital RGB camera.

Moreover, the method includes determining, 104, parameter values of a movement context—i.e., a temporal modality, for example an optical flow—by using the at least two digital images and determining, 106, an influence parameter value which controls an influence of one of the digital images—i.e., the spatial modality—and the parameter values of the movement context on the input data which are used within a first trained machine learning system, which has a first learning model, for generating the control signal, 108. The generated control signal or signals can be used to control a robotic assistance system, a surgical robot and/or other digital systems and/or systems moved by motor.

FIG. 2 shows a basic structure 200 of a first exemplary embodiment of a system which implements the proposed concept. In this case, the generated control signal 202 is an inference value 202 of the first machine learning system 204 (ML system). As input data, this first ML system 204 uses at least one of the recorded digital images 206 and information of a movement context, which is generated, for example, in the form of a feature tensor 210 (e.g., F1) as an inference result of a fifth ML system 208.

Moreover, an influence parameter value 214 is generated, the latter controlling an influence of one of the digital images—i.e., the spatial modality—and of the parameter values of the movement context—i.e., the temporal modality-on the input data of the first ML system 204. The influence parameter value 214 may be generated by an image analysis system 212—e.g., in the form of a further trained ML system 212—which characterizes an image property—e.g., an image unsharpness map (or any other aforementioned map or index value)—in the form of appropriate parameter values. The influence parameter value 214 can be considered to be a weight parameter value between the image data supplied directly to the first ML system 204 (uppermost input arrow) and the information of a movement context (cf. feature tensor 204).

It should also be mentioned that the image data—i.e., the recorded digital images 206—may be available as white-light recordings, as fluorescence recordings (i.e., optionally with contrast agent having been previously applied into the tissue) and/or as OCT data (expanded interpretation of the term "image data").

Figure 3:
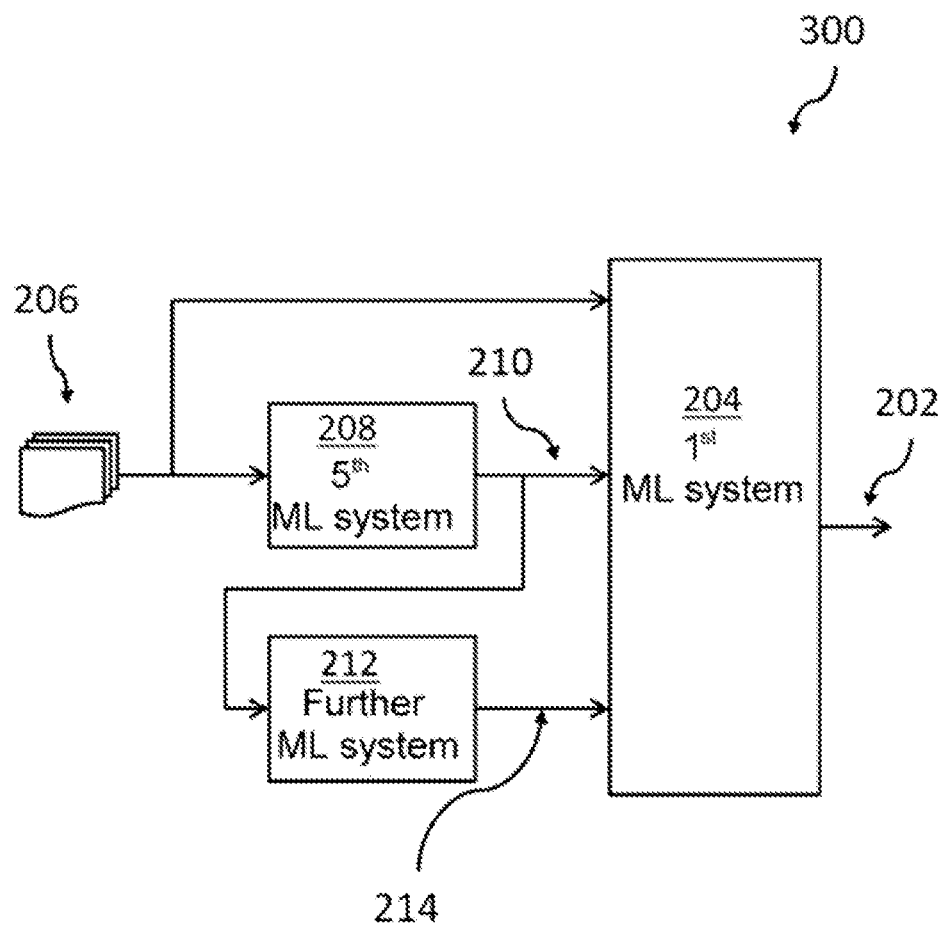
FIG. 3 shows an alternative basic structure of an exemplary embodiment of a system which implements the proposed concept.

FIG. 3 shows an alternative basic structure 300 of an exemplary embodiment of a system which implements the proposed concept. In this case, the image information from the digital images 206 are not fed to the further ML system 212 directly but are fed in the form of output data—as a feature tensor 210—of the 5th ML system 208, which predicts the data of the spatial modality as output data. Hence, information in respect of the temporal modality can be worked into the further ML system 212 and can be used as a weight parameter value 214 (cf. FIGS. 1 and 2).

Figure 4:
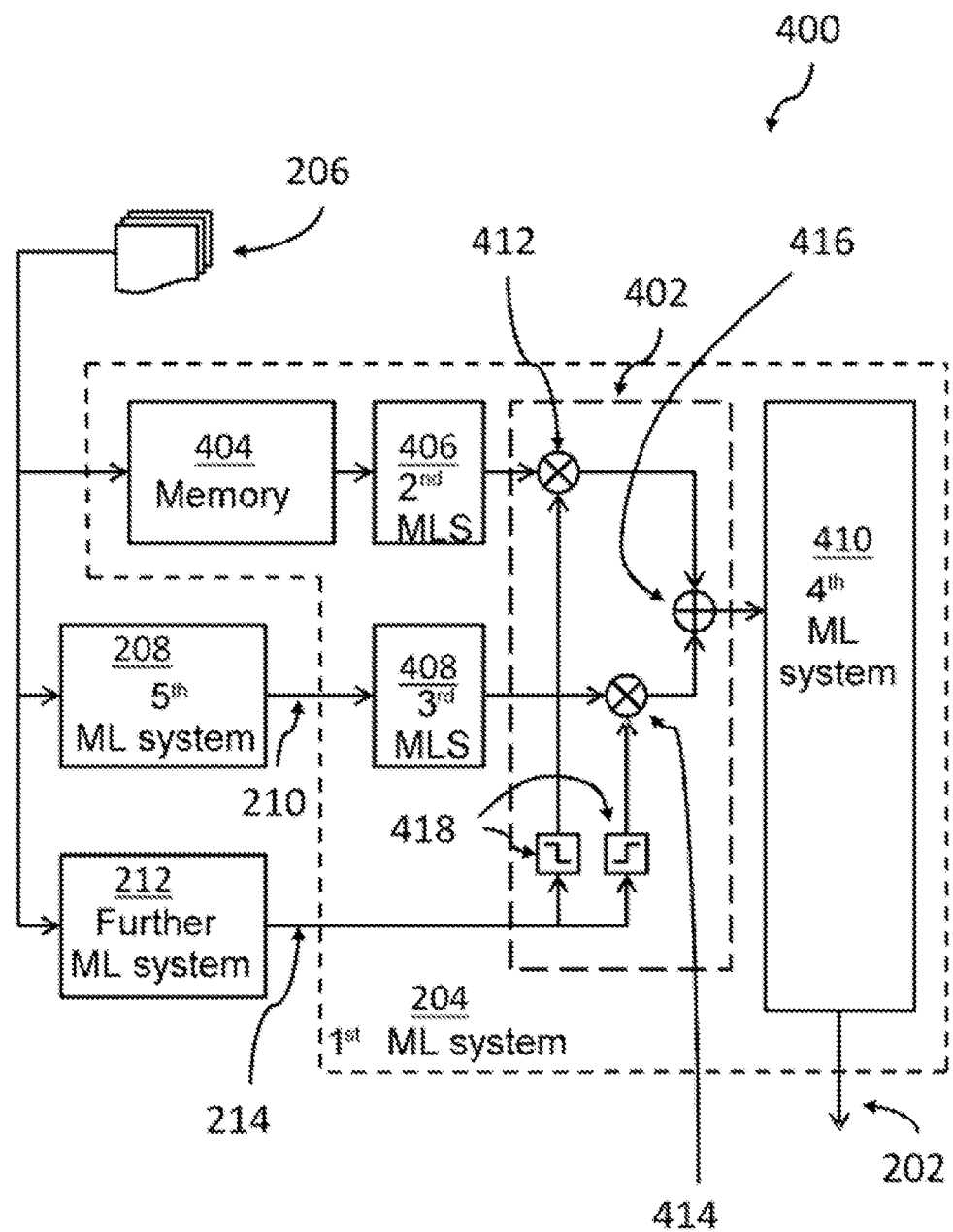
FIG. 4 shows an exemplary embodiment, more akin to implementation, of a system which implements the proposed concept.

FIG. 4 shows an exemplary embodiment 400, more akin to implementation, of a system which implements the proposed concept in a first architecture. The first ML system 204 is depicted with more details in this illustration. Like in the previous illustrations of FIGS. 2 and 3, the symbolically represented signal paths between the individual elements of the exemplary embodiment 400 may consist of a plurality of parallel signal paths in this case, too.

The details of the first ML system 204 in this case additionally show the optional memory 404, in which for example the respective most recently provided digital image 206 (or any other selected digital image) of a temporal sequence of digital images can be stored. Additionally, a second ML system 406 (MLS) and a third ML system 408, which each have appropriate trained learning models, are illustrated.

The second ML system 406 generates at its output as an inference value a first feature tensor (e.g., scalar value, vector field values, matrix values, tensor field values) for the spatial modality of a digital image; the third ML system 408 generates at its output as an inference value a second feature tensor for the temporal modality of a sequence of digital images (e.g., the optical flow).

Both feature tensors serve as input values for the weight unit 402, which receives a third input value 214 coming from the further ML system 212 that describes an image property as output values (or tensor). By way of the multipliers 412, 414, there is control on the basis of the influence parameter value 214 and the sketched threshold switches 418 (essentially the use of parallel AND gates) as to whether the spatial modality from the second ML system 406 or the temporal modality (or associated information or data) from the third ML system 408 serves as input values for a fourth ML system 410 via the depicted summation function 416 (or module; essentially a set of parallel OR gates), said fourth ML system as a consequence predicting or generating the control signal 202 for a robotic surgical assistance system.

The expression "external control" for the weighting in relation to the first and the second feature tensor is also explained as a result of the further ML system 212 being depicted outside of the first ML system 204. An architecturally alternative embodiment is depicted below (cf. FIG. 5), an "internal control" which is influenced by uncertainty factors in respect of the inference values of ML systems being provided therein in contrast to the "external control".

It should also be mentioned that one of the input ML systems—i.e., the second ML system 406 and the third ML system 408—may already be realized as a fusion network. By way of example, the fifth ML system 208 and the third ML system 408 would be well suited to this end. However, other combinations/integrations of other partial machine learning systems with a combined learning model would be trained by training data consisting of the digital images 206 and corresponding inference results for associated second feature tensors (or other tensors in the case of other combinations) in a supervised learning process.

It should additionally be mentioned that both input ML systems—i.e., the second ML system 406 and the third ML system 408—may already be fusion networks, to which both individual digital images 206 and a sequence of digital images 206 are fed as input data. The fusion of the spatial and the temporal modality would be trained simultaneously with a corresponding training for such neural networks.

Figure 5:
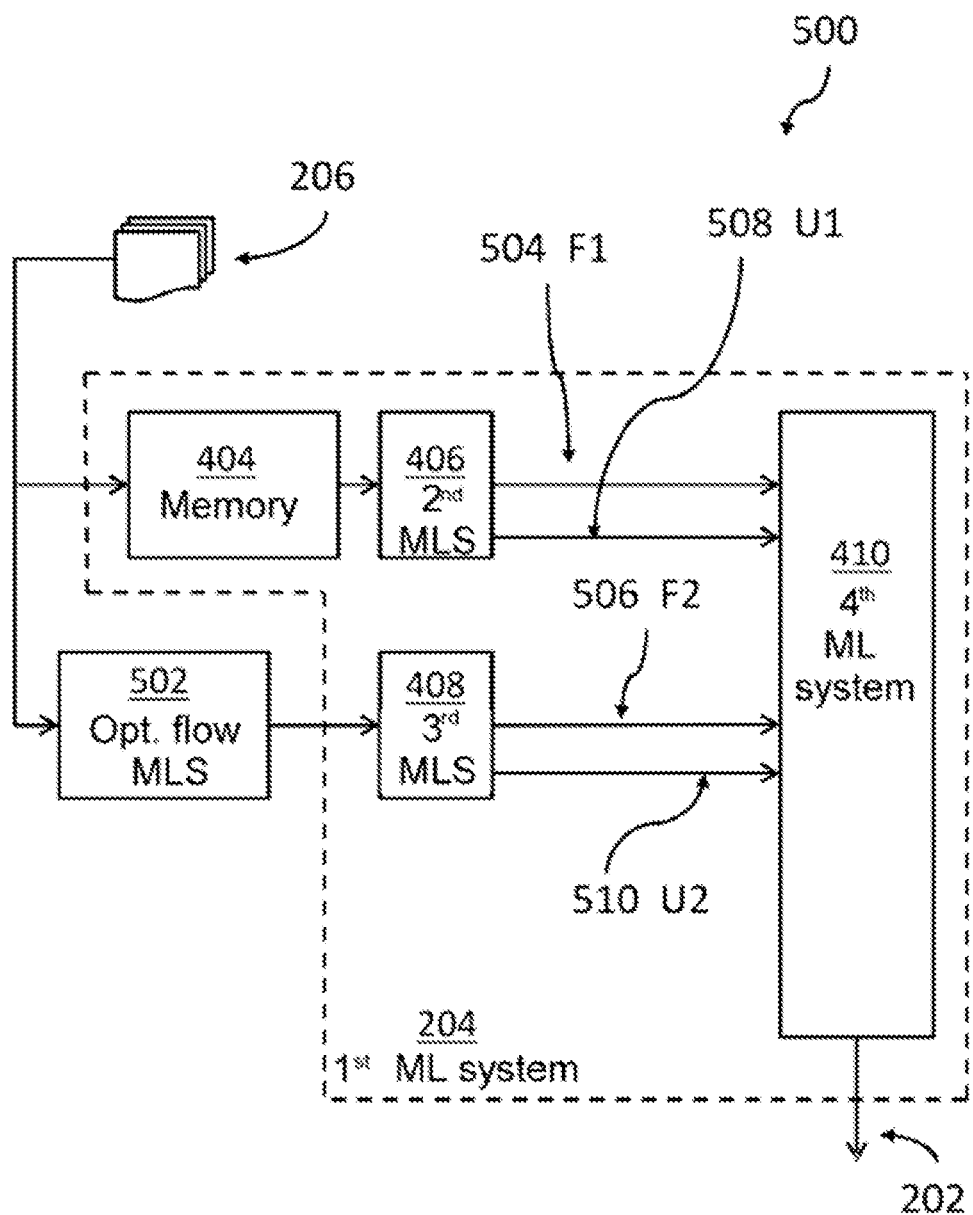
FIG. 5 depicts an implementation alternative having an "internal control".

FIG. 5 depicts the aforementioned architecturally different implementation alternative 500 with an "internal control"—by means of inference uncertainty values. In this case, information T in respect of the temporal modality is determined by means of the "optical flow" ML system 502 from the input stream of digital images (at least two digital images) 206. In this example, the internals of the first ML system 204 are interconnected-slightly differently than depicted in FIG. 4. Thus, the further ML system 212, which was present in the previous architecture alternatives, is missing.

The feature tensor 504, which may be denoted F1 and which characterizes the spatial modality, is determined by way of the potentially optional image memory 404 (e.g., the latter in each case storing the most recent digital image) and the second ML system 406. On the other side, the second feature tensor 506, which may be denoted as F2 and which characterizes the temporal modality, is determined by way of the "optical flow" ML system 502 and the third ML system 408.

However, the 2nd ML system 406 and the 3rd ML system 408 also generate respective inference uncertainty values 508 (U1), 510 (U2), which are also used as additional input values for the fourth ML system 410. In this way it is possible to dispense with the weight unit 402 (cf. FIG. 4). In such a scenario, the respective ML systems would form appropriate learning models in individual supervised learning processes, which learning models generate the respective inference or output values (e.g., corresponding scalar values, vector field values, matrix values, tensor field values) during the inference phase. In this case, too, the influence of the uncertainty values would be taken into account by way of appropriate training data.

In such an exemplary embodiment, it is also conceivable that one of the neural input networks (406, 408) (or both the neural input networks) already is a fusion network. Thus, a combination of the neural networks of the "optical flow" ML system 502 and of the third ML system 408 would be conceivable by all means. An exemplary learning model capable of predicting or generating the second feature tensor 506 and the associated uncertainty value 510 would be created by means of appropriate training data.

In summary, this exemplary embodiment could also be described as follows: According to this aspect of the present disclosure, a computer-implemented method for generating a control signal by locating at least one instrument by way of a combination of machine learning systems on the basis of digital images is presented. In this case, the method includes providing at least two digital images of the same spatial scene with a movement of the instrument in the scene as input data, determining parameter values of a movement context by using the at least two digital images and determining uncertainty values which control an influence of one of the digital images and the parameter values of the movement context on the input data which are used within a first trained machine learning system, which has a first learning model, for generating the control signal.

Figure 6:
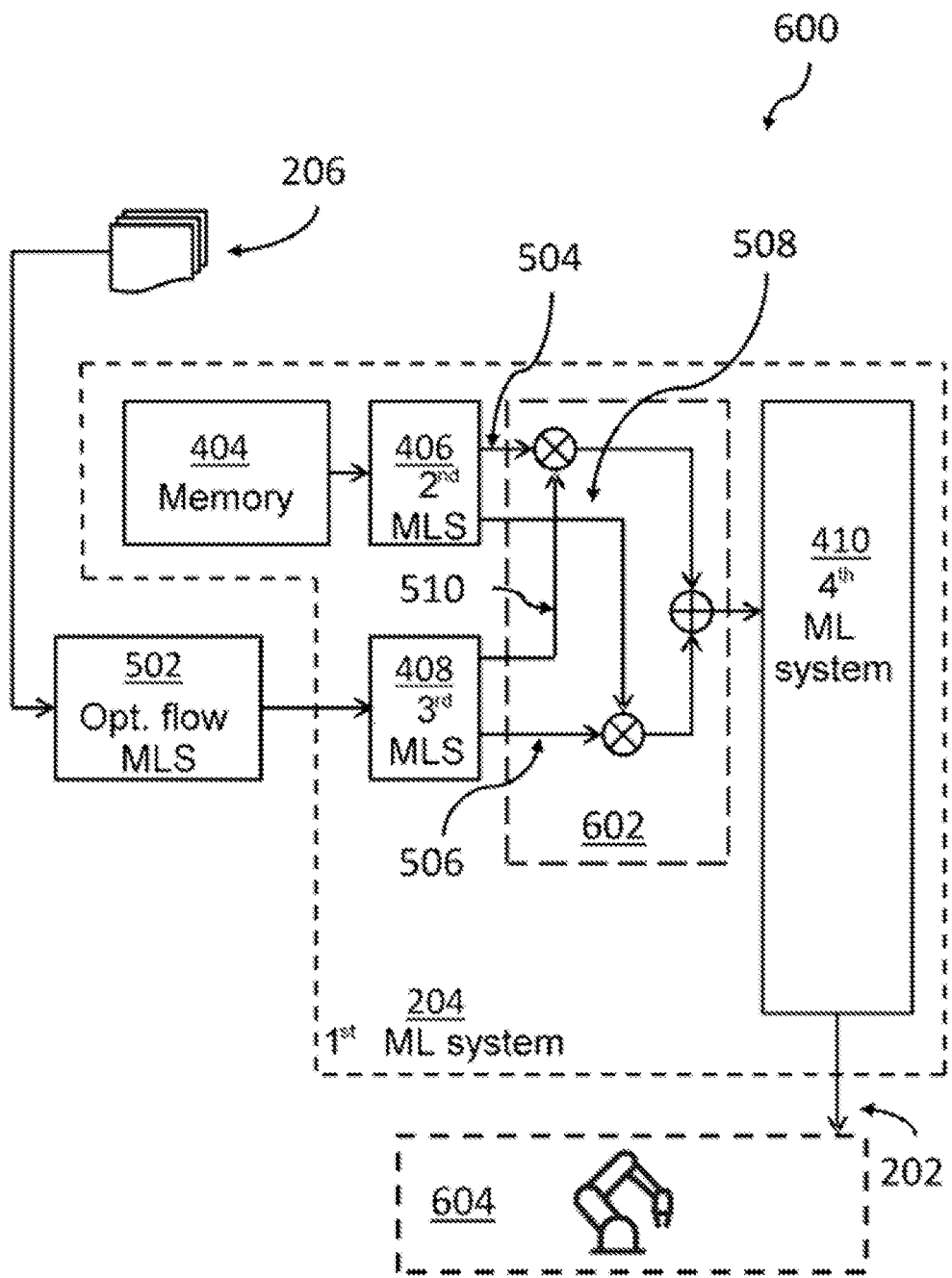
FIG. 6 shows a further exemplary embodiment for the "internal control" case.

FIG. 6 shows a further exemplary embodiment 600 for the "internal control" case. In this case, the uncertainty values 508 (U1) and 506 (U2) are not used directly as input values for the fourth ML system 410 but are processed by a weight unit 602 which substantially has the same structure as the weight unit 402 (cf. FIG. 4). Here, too, use is made of two multiplication units and a corresponding summation unit (in each case without reference sign), which generate an input signal (or a weighted bundle of input signals) for the fourth ML system 410 in order to generate the control signal 202 for a digital assistance system or a robotic, surgical assistance system or any other assisting (surgical) microscope functionality 604—which is depicted here in exemplary fashion.

It should be observed in this case that the proposed concept can be implemented in such a way that the feature tensors 504 F1 and 506 F2 are multiplied pixel-by-pixel by the uncertainty tensors 510 U2 and 508 U1, respectively, before they are added by the summation unit. This type of combination of the feature tensors F1 and F2 with the uncertainty tensors U2 and U1 is considered to be an example for a fusion mechanism of the output tensors of the second and third machine learning system 406, 408. The feature tensors F1 and F2 can also be understood as "feature maps".

Thus, the weight unit 602 is used in this case to fuse the spatial and temporal information on the basis of the uncertainty values 508, 510. If the spatial uncertainty value U1 508 is high in one region, this means that the second ML system 406 is uncertain in respect of its inference value/its inference values (e.g., its pixel-by-pixel semantic segmentation inference). Therefore, it is advantageous in such a case to amplify or increase the feature tensor F2 506 of the third ML system 408 vis-à-vis the feature tensor F1 (and vice versa).

As a result of this method, features or feature elements—i.e., pixel-by-pixel assigned values of the respective feature tensors ("feature maps")—with high uncertainty values are reduced in terms of their relevance while features or feature elements with low uncertainty values are amplified. This additional constraint when considering spatial and temporal features from a plurality of digital images advantageously delimits the method proposed here from conventional methods.

What applies both to the exemplary embodiment which was described in more detail by FIG. 5 and to the exemplary embodiment which was described in more detail by FIG. 6 is that other input modalities can also be used in addition to the spatial and the temporal modality. The more general approach would thus be to use N modalities as input variables, wherein each modality could be evaluated by an appropriate feature extraction algorithm ALGi, (i=1 . . . . N)—i.e., by a respective specially trained machine learning system in the general case. Then, task-specific uncertainty values or uncertainty indicators Ui can also be determined (e.g., for identifying an instrument tip) for each set of resulting features Fi. The fourth ML learning system would then choose relevant and high-quality features on the basis of the uncertainty indicators (provided no weight unit is used).

Figure 7:
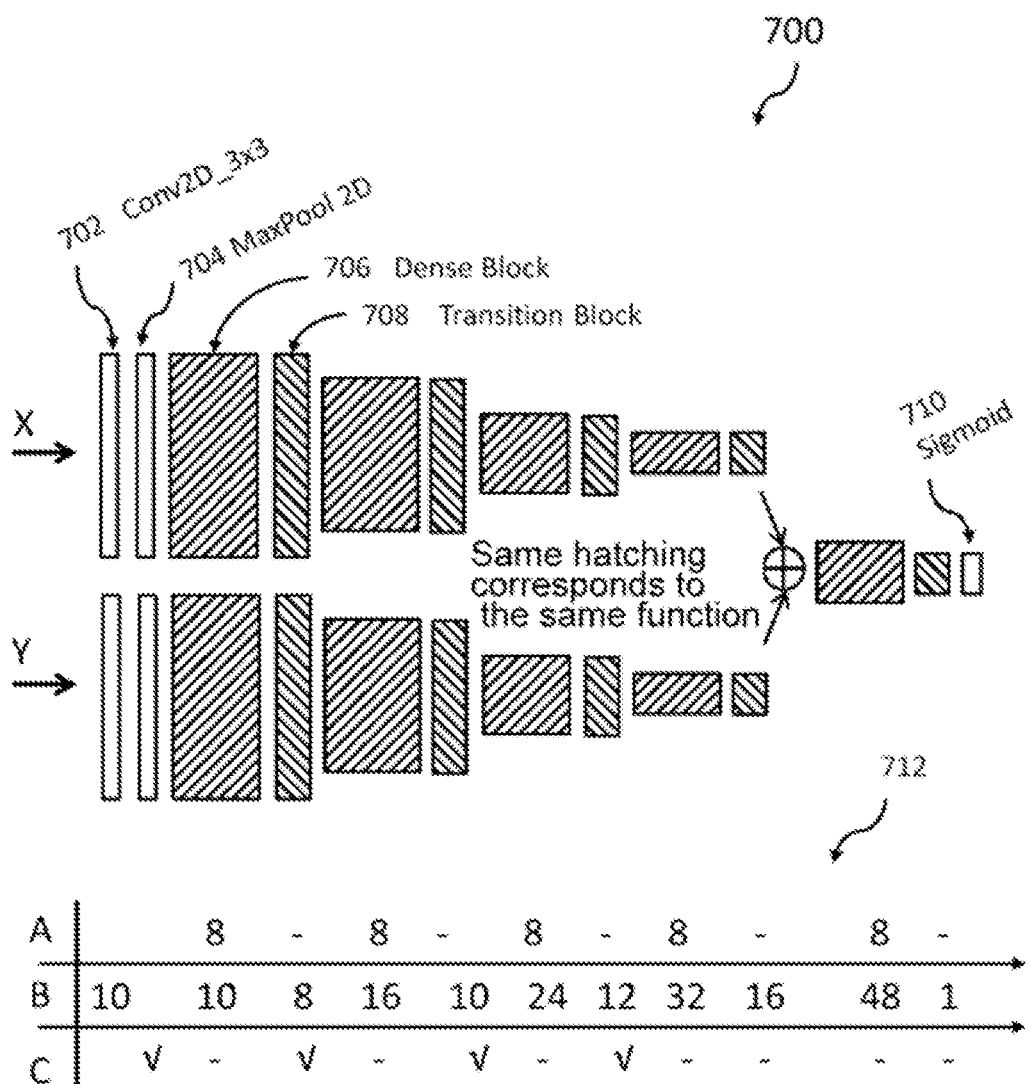
FIG. 7 shows an example of a 2-stream FUS architecture for a fusion network for a digital image and an optical flow.

FIG. 7 shows an example of a 2-stream FUS architecture 700 for a fusion network for a digital image X and an optical flow Y. The resolution of a digital image 206 X and of the input stream of the optical flow is, e.g., 144×256×3 (i.e., 3 color planes) in each case. The elements or functions of the Conv2D_3×3 702, MaxPool2D 704, Dense Block 706, Transition Block 708 and Sigmoid 710 network are known taken by themselves; however, this does not apply to this novel and advantageous combination and the resultant results and advantages therefrom (see above). Further network details are depicted in the table 712, which respectively specifies parameter values for the different layers of the FUS network. The same hatching indicates functionally comparable network planes and network functions. Moreover, it should be mentioned that the 2-stream FUS architecture is realizable in software and completely in hardware, and also as a combination of software and hardware elements.

The base blocks for the upper region (image X) and the lower region (optical flow Y) are designed symmetrically. Fusion is brought about by an addition (cf. addition symbol), as a result of which it is possible to avoid an increase in size of the model. As a result of the addition—in contrast to a concatenation, for example—fewer features are explicitly present in the fusion plane, as a result of which the required model becomes smaller and hence the number of required calculations is reduced. This is to the benefit of the performance or the requirements in respect of the processing hardware.

Thus, a two-stream fusion architecture FUS is advantageous, wherein the digital image and the optical flow serve as input parameter values. The complementary power of the two utilized single stream networks is facilitated in the utilized architecture by virtue of all available information being used by both inputs. To extract deeper-lying features from both input modalities, the two encoder paths are only combined (i.e., added) after the final feature resolution has been attained.

In practical experiments, input data (i.e., digital images) with a resolution of 256×144 were used in each case. In this case, the optical flow was calculated in advance in Cartesian coordinates, that is to say calculated for each image pixel. Moreover, data augmentation techniques were used to artificially generate a greater number of training data. In this case, the data augmentation techniques at least comprised spatial and temporal crop, flip and rotation offsets (the latter only for the optical flow), random changes in contrast and color and brightness adaptations (only for the fixed image data). Both input data streams are typically normalized in respect of mean values and standard deviations. The training loss function is based on the mean square error. Training is typically started with an "untreated" (i.e., not pre-trained) system. In the process, use is made of an Adam optimizer and an initial learning rate of 0.01. The learning rate was adapted up to 10-6 in 10% steps on the basis of a plateau recognition using the validation criteria (on the same domain data) and using a "patience" (i.e., a number of training epochs after which the training is terminated without an improvement being obtained). Moreover, a premature termination of the training was provided for a "patience" of 100. After the training of the ML model was carried out for 12 hours, it was possible to attain an inference time of 50 ms. This time is sufficient to allow a robotic system to provide good assistance in a surgical intervention.

Figure 8:
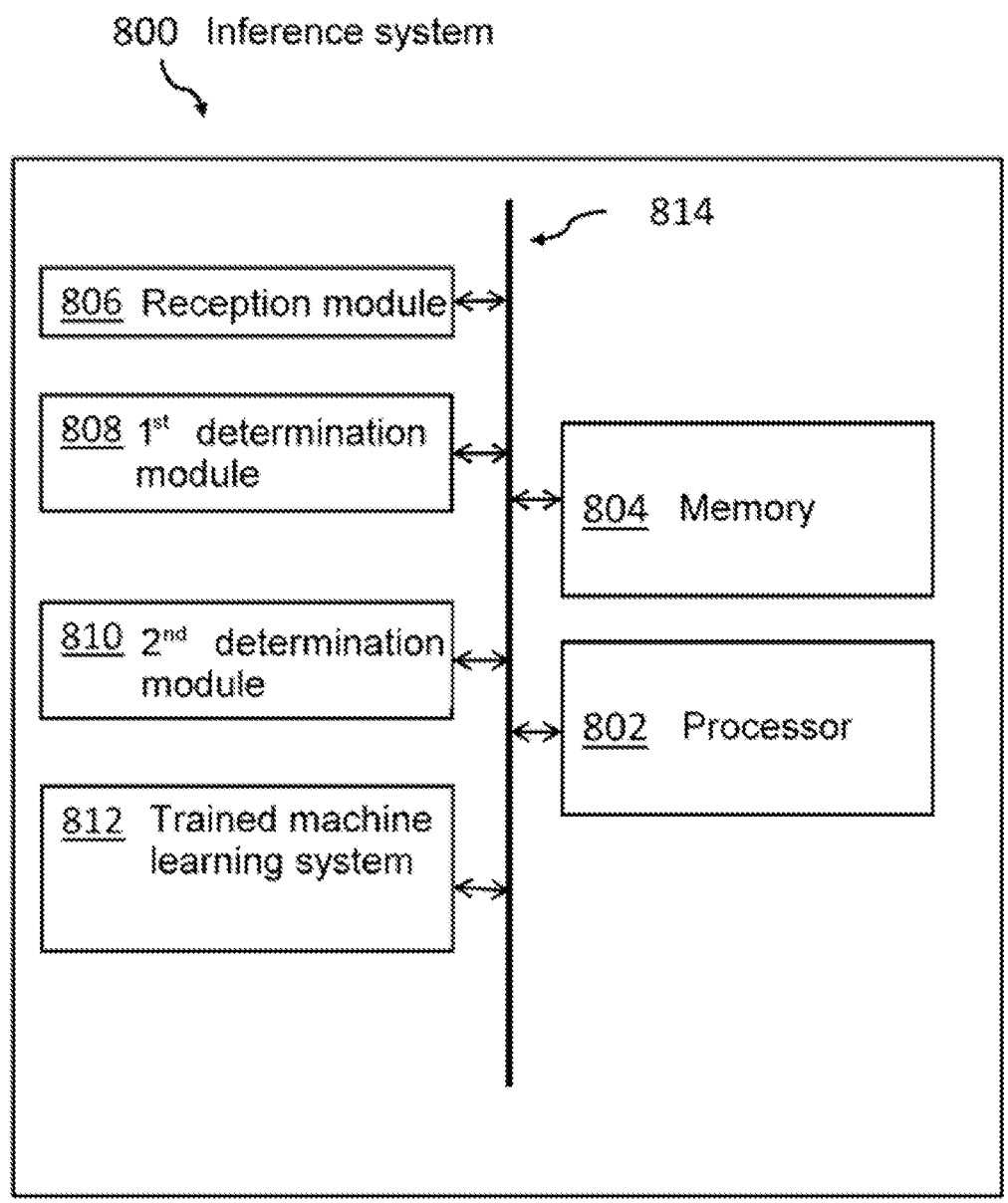
FIG. 8 shows a block diagram of an exemplary embodiment for the control system for generating a control signal by locating at least one instrument by way of a combination of machine learning systems on the basis of digital images.

FIG. 8 symbolically shows a block diagram of an exemplary embodiment of a control system 800 for generating a control signal by locating at least one instrument by way of a combination of machine learning systems on the basis of digital images. The control system 800 comprises a processor 802 and a memory 804 connected to the processor, wherein the memory stores program code segments which, when executed by the processor 802, prompt the processor 802 to receive—in particular by means of a reception module 806—at least two digital images of the same spatial scene with a movement of the instrument in the scene as input data.

Further, the processor 802 can be prompted to determine—e.g., by means of a first determination module 808—parameter values of a movement context by using the at least two digital images and can be prompted—by means of a second determination module 810—to determine an influence parameter value which controls an influence of one of the digital images and the parameter values of the movement context on the input data. In this case, the input data are used to generate the control signal within a first trained machine learning system 812 which has a first learning model.

Express reference is made to the fact that the modules and units mentioned—in particular the processor 802, the memory 804, the reception module 806, the first determination module 808, the second determination module 810 and the trained machine learning system 812—may be connected by electrical signal lines or by way of a system-internal bus system 814 for the purposes of interchanging signals or data.

Figure 9:
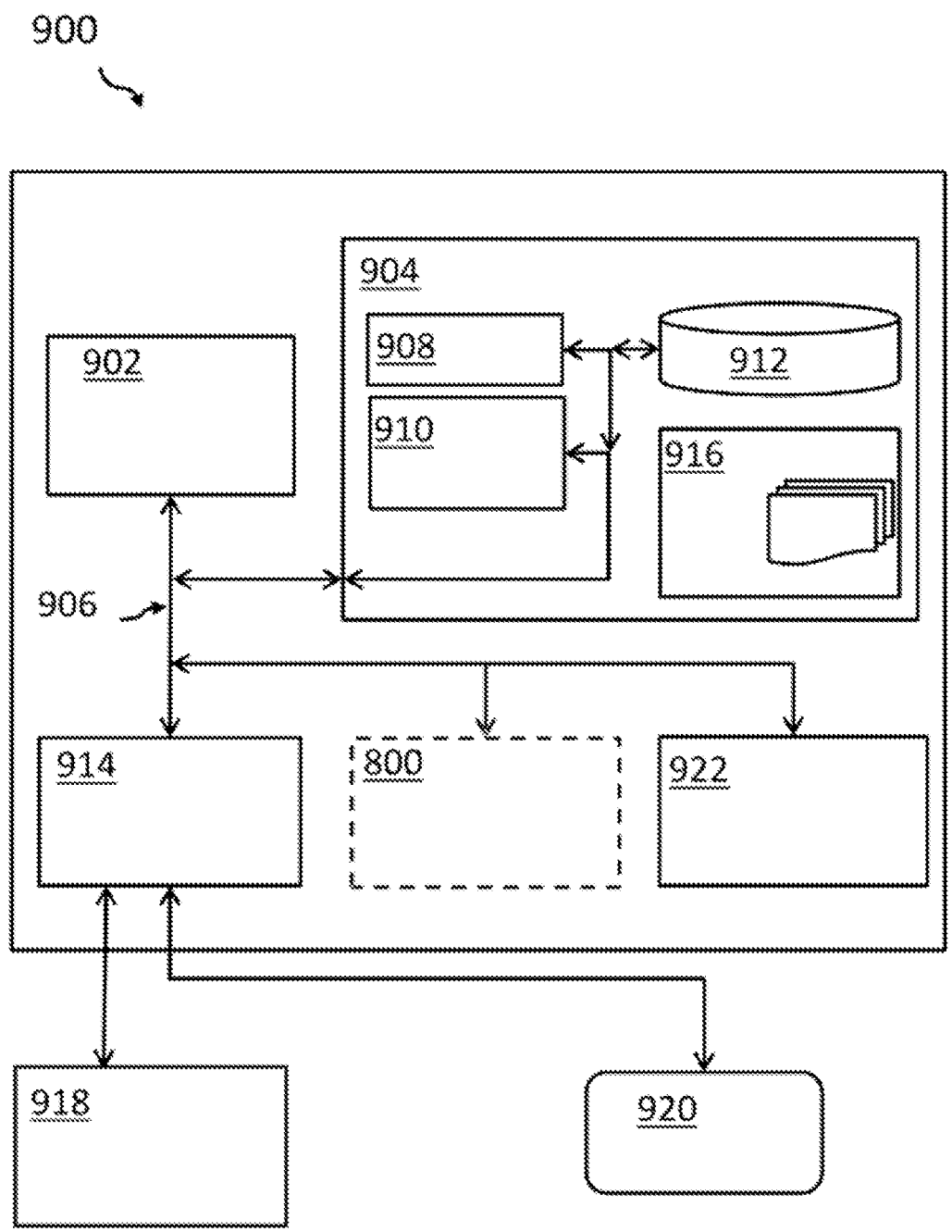
FIG. 9 depicts an exemplary embodiment of a computer system that comprises the system according to FIG. 8.

FIG. 9 represents a block diagram of a computer system 900 which is able to be used as an implementation system for the aforementioned method. Embodiments of the concept proposed here may in principle be used with practically any type of computer, regardless of the platform used therein to store and/or execute program codes. FIG. 9 illustrates by way of example a computer system 900 that is suitable for executing program codes according to the method presented here. It is also possible that a computer system already present in a surgical microscope or in any other surgery assistance system, which computer system may optionally need to be augmented, is used for an at least partial implementation of the method presented here.

The computer system 900 has a plurality of general-purpose functions. The computer system may in this case be a tablet computer, a laptop/notebook computer, some other portable or mobile electronic device, a microprocessor system, a microprocessor-based system, a smartphone, a computer system with specially configured special functions, or else a constituent part of a microscope system. The computer system 900 may be configured so as to execute computer system-executable instructions-such as for example program modules—that may be executed in order to implement functions of the concepts proposed here. For this purpose, the program modules may comprise routines, programs, objects, components, logic, data structures etc. in order to implement particular tasks or particular abstract data types.

The components of the computer system may comprise the following: one or more processors or processing units 902, a storage system 904 and a bus system 906 that connects various system components, including the storage system 904, to the processor 902. The computer system 900 typically has a plurality of volatile or non-volatile storage media accessible by the computer system 900. The storage system 904 may store the data and/or instructions (commands) of the storage media in volatile form-such as for example in a RAM (random access memory) 908—in order to be executed by the processor 902. These data and instructions realize one or more functions and/or steps of the concept presented here. Further components of the storage system 904 may be a permanent memory (ROM) 910 and a long-term memory 912, in which the program modules and data (reference sign 916) and also workflows may be stored.

The computer system comprises a number of dedicated devices (keyboard 918, mouse/pointing device (not illustrated), visual display unit 920, etc.) for communication purposes. These dedicated devices may also be combined in a touch-sensitive display. An I/O controller 914, provided separately, ensures a frictionless exchange of data with external devices. A network adapter 922 is available for communication via a local or global network (LAN, WAN, for example via the Internet). The network adapter may be accessed by other components of the computer system 900 via the bus system 906. It is understood in this case, although it is not illustrated, that other devices may also be connected to the computer system 900.

At least parts of the control system 800 (cf., FIG. 7) may additionally be connected to the bus system 906. The control system 800 and the computer system 900 may optionally use the memories, or parts thereof and/or the processor or processors jointly. Moreover, the computer system 900 may be augmented with special hardware, which may also be connected to the bus system 906 and which has, at least in parts, elements of a machine learning system. Hence, the computer system could be used as a quasi—I/O system of one or more machine learning systems with different architectures or topology, which machine learning systems are implemented in terms of hardware.

The description of the various exemplary embodiments of the present disclosure has been given for the purpose of improved understanding, but does not serve to directly restrict the inventive concept to these exemplary embodiments. A person skilled in the art will himself/herself develop further modifications and variations. The terminology used here has been selected so as to best describe the basic principles of the exemplary embodiments and to make them easily accessible to a person skilled in the art.

The principle presented here may be embodied as a system, as a method, combinations thereof and/or else as a computer program product. The computer program product may in this case comprise one (or more) computer-readable storage medium/media having computer-readable program instructions in order to cause a processor or a control system to implement various aspects of the present disclosure.

As media, electronic, magnetic, optical, electromagnetic or infrared media or semiconductor systems are used as forwarding medium; for example SSDs (solid state devices/drives as solid state memory), RAM (random access memory) and/or ROM (read-only memory), EEPROM (electrically erasable ROM) or any combination thereof. Suitable forwarding media also include propagating electromagnetic waves, electromagnetic waves in waveguides or other transmission media (for example light pulses in optical cables) or electrical signals transmitted in wires.

The computer-readable storage medium may be an embodying device that retains or stores instructions for use by an instruction executing device. The computer-readable program instructions that are described here may also be downloaded onto a corresponding computer system, for example as a (smartphone) app from a service provider via a cable-based connection or a mobile radio network.

The computer-readable program instructions for executing operations of the disclosure described here may be machine-dependent or machine-independent instructions, microcode, firmware, status-defining data or any source code or object code that is written for example in C++, Java or the like or in conventional procedural programming languages such as for example the programming language "C" or similar programming languages. The computer-readable program instructions may be executed in full by a computer system. In some exemplary embodiments, there may also be electronic circuits, such as, for example, programmable logic circuits, field-programmable gate arrays (FPGAs) or programmable logic arrays (PLAs), which execute the computer-readable program instructions by using status information of the computer-readable program instructions in order to configure or to individualize the electronic circuits according to aspects of the present disclosure.

The disclosure presented here is furthermore illustrated with reference to flowcharts and/or block diagrams of methods, devices (systems) and computer program products according to exemplary embodiments of the disclosure. It should be pointed out that practically any block of the flowcharts and/or block diagrams can be embodied as computer-readable program instructions.

The computer-readable program instructions can be made available to a general purpose computer, a special computer or a data processing system programmable in some other way, in order to produce a machine, such that the instructions that are executed by the processor or the computer or other programmable data processing devices generate means for implementing the functions or processes illustrated in the flowchart and/or block diagrams. These computer-readable program instructions can correspondingly also be stored on a computer-readable storage medium.

In this sense any block in the illustrated flowchart or block diagrams can represent a module, a segment or portions of instructions representing a plurality of executable instructions for implementing the specific logic function. In some exemplary embodiments, the functions represented in the individual blocks can be implemented in a different order-optionally also in parallel.

The illustrated structures, materials, sequences and equivalents of all means and/or steps with associated functions in the claims hereinafter are intended to apply all structures, materials or sequences as expressed by the claims.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method for generating a control signal by locating at least one instrument by way of a combination of machine learning systems on the basis of digital images, the method comprising:
    providing at least two digital images of the same spatial scene with a movement of the instrument in the scene as input data;
    determining parameter values of a movement context by using the at least two digital images; and
    determining an influence parameter value, which controls the influence of:
    one of the digital images, and
    the parameter values of the movement context on the input data which are used within a first trained machine learning system, which has a first learning model, for generating the control signal,
    wherein the first trained machine learning system comprises:
    a second machine learning system which was trained to generate output values in the form of a first feature tensor from at least one digital image;
    a third machine learning system which was trained for generating output values in the form of a second feature tensor from the parameter values of the movement context; and
    a weight unit adapted to control the influence of the first feature tensor vis-à-vis the influence of the second feature tensor on a fourth machine learning system in the first trained machine learning system.

2. The method of claim 1, wherein the control signal is adapted to control a robotic visualization system.

3. The method of claim 1, wherein the influence parameter value is determined by extracting parameter values of an image property from at least one of the at least two digital images.

4. The method of claim 3, wherein the parameter values of the image property are represented by at least one image property selected from a group comprising: an image unsharpness map; an image contrast map; an image color saturation map; an image color homogeneity map; an indicator value for specular reflection zones; an image brightness map; a shadow effect indicator value; a masking index value; and an image artifact index value, in each case related to the at least one image.

5. The method of claim 3, wherein:
    at least one of the at least two digital images;
    the parameter values of the movement context; and
    the parameter values of the image property are used as input values for the first trained machine learning system.

6. The method of claim 1, further comprising:
    increasing the influence of the first feature tensor vis-à-vis the second feature tensor if an image property value is higher than a given threshold; and
    increasing the influence of the second feature tensor vis-à-vis the first feature tensor if the image property value is lower than a given threshold.

7. The method of claim 6, wherein:
    in optically sharp image regions, the second feature tensor is over-weighted vis-à-vis the first feature tensor; and
    in optically blurred image regions, the first feature tensor is over-weighted vis-à-vis the second feature tensor.

8. A computer-implemented method for generating a control signal by locating at least one instrument by way of a combination of machine learning systems on the basis of digital images, the method comprising:
    providing at least two digital images of the same spatial scene with a movement of the instrument in the scene as input data;
    determining parameter values of a movement context by using the at least two digital images; and
    determining an influence parameter value, which controls the influence of:
    one of the digital images; and
    the parameter values of the movement context on the input data which are used within a first trained machine learning system, which has a first learning model, for generating the control signal,
    wherein the first trained machine learning system comprises:
    a second machine learning system which was trained to generate values of a first feature tensor and a first uncertainty value from at least one digital image; and
    a third machine learning system which was trained to generate values of a second feature tensor and a second uncertainty value from the parameter values of the movement context, with the first feature tensor and the first uncertainty value and the second feature tensor and the second uncertainty value serving as input data for a fourth machine learning system which was trained to generate the control signal.

9. The method of claim 8, wherein the first trained machine learning system additionally comprises a weight unit which controls the influence of the first feature tensor vis-à-vis the influence of the second feature tensor on the fourth machine learning system.

10. The method of claim 9, further comprising:
increasing the influence of the first feature tensor vis-à-vis the second feature tensor if the second uncertainty value is higher than the first uncertainty value, and
increasing the influence of the second feature tensor vis-à-vis the first feature tensor if the first uncertainty value is higher than the second uncertainty value.

11. The method of claim 8, wherein either the first uncertainty value or the second uncertainty value is zero.

12. The method of claim 8, wherein uncertainty values are determined by an ensemble learning method.

13. A control system for generating a control signal by locating at least one instrument by way of a combination of machine learning systems on the basis of digital images, the control system comprising:
a processor and a memory connected to the processor, the memory storing program code segments which, when executed by the processor, prompt the processor to perform operations comprising:
receiving at least two digital images of the same spatial scene with a movement of the instrument in the scene as input data;
determining parameter values of a movement context by using the at least two digital images; and
determining an influence parameter value, which controls the influence of:
one of the digital images; and
the parameter values of the movement context on the input data which are used within a first trained machine learning system, which has a first learning model, for generating the control signal,
wherein the first trained machine learning system comprises one of:
a system comprising:
a second machine learning system which was trained to generate output values in the form of a first feature tensor from at least one digital image;
a third machine learning system which was trained for generating output values in the form of a second feature tensor from the parameter values of the movement context; and
a weight unit adapted to control the influence of the first feature tensor vis-à-vis the influence of the second feature tensor on a fourth machine learning system in the first trained machine learning system; and
a system comprising:
a second machine learning system which was trained to generate values of a first feature tensor and a first uncertainty value from at least one of the digital images; and
a third machine learning system which was trained to generate values of a second feature tensor and a second uncertainty value from the parameter values of the movement context, with the first feature tensor and the first uncertainty value and the second feature tensor and the second uncertainty value serving as input data for a fourth machine learning system which was trained to generate the control signal.

14. The control system of claim 13, wherein the control signal is adapted to control a robotic visualization system.

15. The control system of claim 13, wherein the influence parameter value is determined by extracting parameter values of an image property from at least one of the at least two digital images.

16. The control system of claim 15, wherein the parameter values of the image property are represented by at least one image property selected from a group comprising: an image unsharpness map; an image contrast map; an image color saturation map; an image color homogeneity map; an indicator value for specular reflection zones; an image brightness map; a shadow effect indicator value; a masking index value; and an image artifact index value, in each case related to the at least one image.

17. The control system of claim 15, wherein:
at least one of the at least two digital images;
the parameter values of the movement context; and
the parameter values of the image property are used as input values for the first trained machine learning system.

18. The control system of claim 13, wherein the operations further comprise:
increasing the influence of the first feature tensor vis-à-vis the second feature tensor if an image property value is higher than a given threshold, and
increasing the influence of the second feature tensor vis-à-vis the first feature tensor if the image property value is lower than a given threshold.

19. The control system of claim 18, wherein:
in optically sharp image regions, the second feature tensor is over-weighted vis-à-vis the first feature tensor, and
in optically blurred image regions, the first feature tensor is over-weighted vis-à-vis the second feature tensor.

* * * * *